United States Patent

Saikawa et al.

[15] 3,694,436
[45] Sept. 26, 1972

[54] SUBSTITUTED 2-(BENZENESULFONAMIDO)-PYRIMIDINES

[72] Inventors: Isamu Saikawa; Yasumasa Matubara; Takako Hori, all of Toyama, Japan

[73] Assignee: Toyama Chemical Co., Ltd., Tokyo, Japan

[22] Filed: March 2, 1970

[21] Appl. No.: 15,951

[52] U.S. Cl. ....260/240 D, 260/256.4 N, 260/543 R, 260/599, 424/251
[51] Int. Cl. ............................................C07d 51/42
[58] Field of Search..................................260/240 D

[56] References Cited

UNITED STATES PATENTS 3,519,620   7/1970   Augstein et al............260/240

FOREIGN PATENTS OR APPLICATIONS 1,193,952   1/1966   Germany...................260/251

OTHER PUBLICATIONS

Gutsche et al., Arzneimittel–Forsch 14, 373–6 (1964).

*Primary Examiner*—Henry R. Jiles
*Assistant Examiner*—G. Thomas Todd
*Attorney*—Waters, Roditi, Schwartz & Nissen

[57] ABSTRACT

Novel sulfonamide derivatives having a pyrimidine ring, represented by the formula (I),

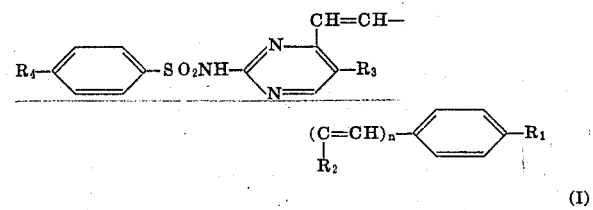

(I)

wherein $R_1$, $R_3$ and $R_4$ are a hydrogen atom, a lower alkyl group having one to five carbon atoms or a halogen atom; $R_2$ is a hydrogen atom or a lower alkyl group having one to five carbon atoms; $n$ is 0 or 1. The sulfonamide derivatives have potent blood sugar lowering activity and are prepared by reacting a pyrimidine compound of the formula (II),

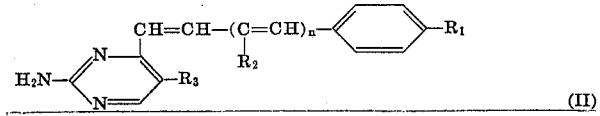

(II)

wherein $R_1$, $R_2$, $R_3$ and $n$ have the same meanings as defined above, with a sulfonamide compound of the formula (III),

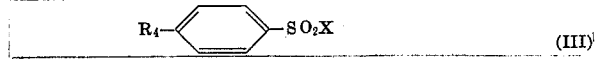

(III)

wherein $R_4$ has the same meaning as defined above and X is a halogen atom or a reactive group capable of forming a —$SO_2NH$— group, in the absence or presence of a solvent, and in the presence of an acylation catalyst.

7 Claims, No Drawings

SUBSTITUTED 2-(BENZENESULFONAMIDO)-PYRIMIDINES

This invention relates to new sulfonamide derivatives having pyrimidine ring represented by the formula,

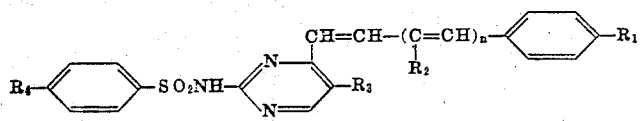

wherein $R_1$, $R_3$ and $R_4$ are a hydrogen atom, a straight- or branched-chain lower alkyl group having one to five carbon atoms such as methyl, ethyl, propyl, isopropyl, n-butyl, isobutyl, n-amyl or isoamyl group, or a halogen atom such as fluorine, chlorine, bromine or iodine atom; $R_2$ is a hydrogen atom, or a straight- or branched-chain lower alkyl group having one to five carbon atoms such as methyl, ethyl, propyl, isopropyl, n-butyl, isobutyl, n-amyl or isoamyl group; and $n$ is an integer of 0 or 1.

The sulfonamide derivatives represented by the formula (I) are novel and possess potent blood sugar lowering activity.

One object of the present invention is to provide novel sulfonamide derivatives represented by the formula (I) useful as a blood sugar lowering agent.

Another object of the present invention is to provide a process for producing said sulfonamide derivatives represented by the formula (I) by reacting a 2-aminopyrimidine compound represented by the formula (II),

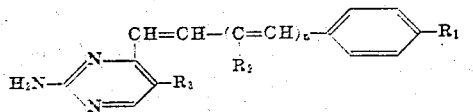

wherein $R_1$, $R_2$, $R_3$ and $n$ have the same meanings as defined above, with a benzenesulfonyl compound of the formula (III),

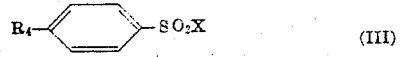

wherein $R_4$ has the same meanings as defined above and X is a halogen atom such as chlorine or bromine atom, or a reactive group capable of forming —SO$_2$NH— group such as a mixed acid anhydride, ester residue or cyanide group, in the absence or presence of an inert solvent such as dioxane, acetone, tetrahydrofuran, dimethylformamide diethylformamide, dimethylacetamide or the like, in the presence of an acylation catalyst such as pyridine, picoline, lutidine, quinoline, dimethylaniline, triethylamine, sodium acetate or the like.

The reaction is carried out first at room temperature and then at an elevated temperature to about 60° to 120° C. If desired, the temperature may be varied lower or higher. The reaction proceeds rapidly and a yellow or brown reaction mixture is formed from which crystals are rapidly precipitated. After completion of the reaction, the crystals may be separated from the reaction mixture by means of a conventional method. For example, the reaction mixture is cooled to obtain the desired product in the form of precipitates, then the product is filtered, washed and dried. The crude product may be recrystallized with an organic solvent such as ethylene glycol monomethylether, dimethylformamide or the like.

The starting materials in the process of the present invention having the formula (II) may be obtained by reacting a 2-amino-4-methyl-5-substituted pyrimidine compound having the formula (IV),

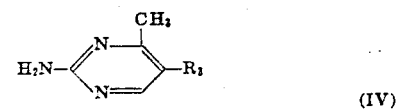

wherein $R_3$ has the same meaning as defined above, with a phenylaldehyde compound having the formula (V),

wherein $R_1$, $R_2$ and $n$ have the same meanings as defined above, in acetic acid in the presence of sulfuric acid.

The pharmacological test of some typical compounds of the present invention represented by the formula (I) are studied as follows.

Alloxan monohydrate dissolved in distilled water was intravenously injected at the dosage of 75 mg/kg to the tail vein of mice weighing 20 – 25 g.

At the 7th day after administration of alloxan, 0.02 milliliter of blood was taken by capillary from the venous plexus of eyeground of the mice abstained from food for 16 hours at the certain intervals before and after administration of the compound to be tested. In the above experiment the compound was administered peritoneally at the dosage of 100 mg/kg. The blood sugar titer was determined and the rate of decrease of blood sugar was calculated.

Rate of fall of blood sugar concentration (%) = (A − B/A − 50) × 100

(A: Titer before administration of the compound)
(B: Titer after administration of the compound)

The experimental results are shown in Table 1.

TABLE 1

| Compound | Rate of fall of blood sugar concentration (percent) |
|---|---|
| H₃C–⟨C₆H₄⟩–SO₂NH–[pyrimidine(CH=CH–Ph)] | 95.1±5.5 |
| H₃C–⟨C₆H₄⟩–SO₂NH–[pyrimidine(CH=CH–Ph)(Br)] | 88.2±6.3 |
| ⟨C₆H₅⟩–SO₂NH–[pyrimidine(CH=CH–CH=CH–Ph)] | 71.7±9.9 |
| H₃C–⟨C₆H₄⟩–SO₂NH–[pyrimidine(CH=CH–CH=CH–Ph)(CH₃)] | 75.8±17 |
| ⟨C₆H₅⟩–SO₂NH–[pyrimidine(CH=CH–CH=CH–⟨C₆H₄⟩–CH₃)(CH₃)] | 83.3±18.8 |
| ⟨C₆H₅⟩–SO₂NH–[pyrimidine(CH=CH–C(CH₃)=CH–⟨C₆H₄⟩–Cl)] | 73.6±5.6 |
| H₃C–⟨C₆H₄⟩–SO₂NH–C(=O)–NH–C₄H₉ | 53.7±17.3 |

Tolbutamide: N¹-(p-toluenesulfonyl)-N²-(n-butyl)-urea.

As shown in Table 1, the blood sugar lowering activity of the novel compounds of the present invention are superior to that of tolbutamide. And not any toxicities of the present compounds are observed at the dosage of 2 g/kg/day to mice.

The following examples are given for the purpose of illustrating the present invention, but are not intended to limit the scope thereof.

EXAMPLE 1

Preparation of 2-amino-5-bromo-4-styryl-pyrimidine

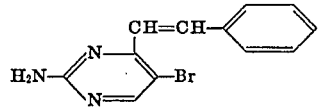

2.95 g. of 2-amino-4-methyl-4-bromopyrimidine was dissolved in 30 ml. of glacial acetic acid, and to this solution, 6 ml. of conc. sulfuric acid was added under ice-cooling. Then 1.68 g. of benzaldehyde and 2.5 ml. of acetic anhydride were added thereto at 25°– 27° C. and the reaction mixture was heated at 50° to 60° C for 8 hours. Yellow crystals precipitated from the reaction mixture were isolated by filtration. The thus obtained crystals were suspended in 90 ml. water and neutralized with aqueous ammonia to obtain crude yellow crystals melting at 149° –150° C. Yield: 3 g. (69 percent). Recrystallization with ethanol to obtain yellow crystals in needle form, melting at 151° – 153° C.

Elemental analysis: $C_{12}H_{10}N_3Br$:
Calcd.: C, 52.19 (%); H, 3.65 (%)
Found: C, 51.94 (%); H, 3.89 (%)

EXAMPLE 2

Preparation of 2-amino-4-(4-phenyl-1,3-butadienyl)-pyrimidine.

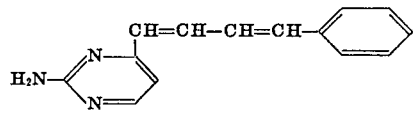

1.0 g. of 2-amino-4-methylpyrimidine was dissolved in 10 ml. of glacial acetic acid, and to this solution, 2 ml. of conc. sulfuric acid, 1.45 g. of cinnamaldehyde and 0.9 ml. of acetic anhydride were added and heated at 55° – 60° C. for 1 hour, reddish-violet crystals were precipitated. The reaction mixture was kept at the same temperature for another 6 hours. Then the reaction mixture was cooled and the crystals were isolated by filtration and washed with acetic acid. The thus obtained crystals were suspended in water and made alkaline with aqueous ammonia to obtained crude yellow crystals. Yield: 1.0 g. (49 percent). Recrystallization from ethanol produced yellow crystals in the form of plates, melting at 196° – 197° C.

Elemental analysis: $C_{14}H_{13}N_3$:
Calcd.: C, 75.21 (%); H, 5.87 (%)
Found: C, 75.39 (%); H, 5.87 (%)

EXAMPLE 3

Preparation of 2-amino-5-methyl-4-(4-phenyl-1,3-butadienyl)-pyrimidine

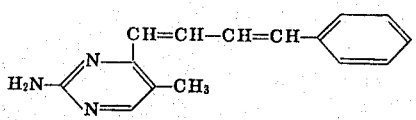

2.0 g. of 2-amino-4,5-dimethylpyrimidine was dissolved in 20 ml. of glacial acetic acid, and to this solution, 4 ml. of conc. sulfuric acid was added under ice-cooling. Sulfuric acid salt of 2-amino-4,5-dimethylpyrimidine in white color was precipitated in the mixture. 2.2 g. of cinnamaldehyde was added thereto dropwise at room temperature and the reaction mixture was heated at 50° – 55° C. for 12 hours. Crystals precipitated in the reaction mixture were isolated by filtration, suspended in water and made alkaline with aqueous ammonia to obtain crude yellow crystals, melting at 169° – 170° C. Yield: 1.4 g. (36.3 percent). Recrystallization from aqueous ethanol produced yellow crystals in the from of prisms, melting at 175° – 176° C.

Elemental analysis: $C_{15}H_{15}N_3$:
Calcd.: C, 75.92 (%); H, 6.37 (%)
Found: C, 76.17 (%); H, 6.47 (%)

EXAMPLE 4

Preparation of 2-amino-5-methyl-4[4-(4-methylphenyl)-1,3-butadienyl]-pyrimidine.

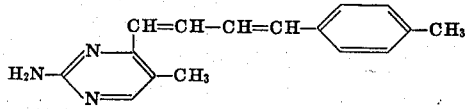

5.0 g. of 2-amino-4,5-dimethylpyrimidine was dissolved in 45 ml. of glacial acetic acid, and to this solution 10 ml. of conc. sulfuric acid was added under ice-cooling. Then, 6.5 g. of p-methylcinnamaldehyde and 4.5 ml. of acetic anhydride were added thereto at room temperature, and the reaction was carried out at 55° – 60° C. for 8 hours. Crystals precipitated in the reaction mixture were isolated by filtration, suspended in water and made alkaline with aqueous ammonia to obtain 2.5 g. (24.7 percent) of crude yellow crystals. Recrystallization from aqueous ethanol produced yellow crystals in the form of plates, melting at 179° – 181° C.

Elemental analysis: $C_{16}H_{17}N_3$
Calcd.: C, 76.46 (%); H, 6.82 (%)
Found: C, 76.23 (%); H, 7.12 (%)

EXAMPLE 5

Preparation of 2-amino-4-[3-methyl-4-(4-chlorophenyl)-1,3-butadienyl]-pyrimidine.

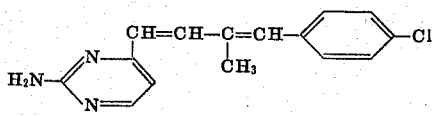

1.0 g. of 2-amino-4-methylpyrimidine was dissolved in 10 ml. of glacial acetic acid, and to this solution 2 ml. of conc. sulfuric acid was added to obtain the sulfuric acid salt of 2-amino-4-methylpyrimidine as a white precipitate in the mixture. Then 0.9 ml. of acetic anhydride and 1.5 g. of 2-methyl-p-chlorocinnamaldehyde were added thereto at room temperature, and the reaction was carried out at 50° – 55° C. for 7.5 hours. Crystals precipitated in the reaction mixture were isolated by filtration, suspended in water and made alkaline with aqueous ammonia to produce crude yellow crystals melting at 176° – 177.5° C. Yield: 0.76 g. (30.4 percent). Recrystallization from methanol produced pale yellow crystals in the form of prisms, melting at 179° 180° C.

Similar to the method as described in Example 1, 2-amino-pyrimidine compounds were obtained as shown in Table 2.

TABLE 2

| $R_1$ | n | $R_2$ | $R_3$ | Melting point (°C.) | Appearance of crystals | | yield (%) |
|---|---|---|---|---|---|---|---|
| | | | | | Color | Form | |
| H | 0 | — | $CH_3$ | 209–209.2 | Pale yellow | Prism | 80.0 |
| H | 0 | — | Cl | 179–179.2 | Pale yellow | Plate | 71.0 |
| H | 1 | $CH_3$ | H | 151–152 | Pale yellow | Needle | 38.0 |
| H | 1 | $CH_3$ | Cl | 179–180 | Pale yellow | Prism | 30.4 |
| H | 1 | $CH_3$ | Br | 193–194 | Pale yellow | Rhombohedron | 29.4 |
| H | 1 | $CH_3$ | $CH_3$ | 158–161 | Pale Yellow | Plate | 13.0 |
| H | 1 | $C_2H_5$ | Br | 164–166 | Yellow Brown | Prism | 31.4 |
| $CH_3$ | 0 | — | H | 152–153 | Pale yellow | Prism | 86.0 |
| $CH_3$ | 0 | — | $CH_3$ | 170–173 | Yellow | Prism | 90.0 |
| $CH_3$ | 1 | H | H | 175–176 | Yellow | Prism | 36.3 |
| $CH_3$ | 1 | $CH_3$ | $CH_3$ | 170–173 | Yellow | Prism | 12.1 |
| $CH_3$ | 1 | $CH_3$ | H | 184–185 | Yellow | Plate | 41.4 |
| Br | 0 | — | H | 198–198.2 | Yellow | Needle | 69.0 |
| Br | 0 | — | Br | 188–189 | Yellow | Needle | 77.8 |

EXAMPLE 6

Preparation of 2-(p-toluenesulfonamido)-4-styryl-pyrimidine

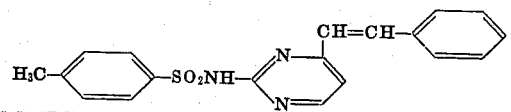

melting Yield:

A mixture of 0.6 g. of 2-amino-4-styrylpyrimidine, 0.65 g. of p-toluenesulfonylchloride and 7 ml. of pyridine was slowly heated and was kept at 90° – 100° C. for 7 hours. After cooling the reaction mixture, the crystals formed in the reaction mixture were isolated by filtration and washed with water and ethanol. Recrystallization from dimethylformamide produced 0.6 g. of yellow crystals in the form of needles, melting at 254° – 255° C.

Elemental analysis: $C_{19}H_{17}O_2N_2S$:
Calcd.: C, 64.94 (%); H, 4.88 (%)
Found: C, 65.00 (%); H, 5.05 (%)

EXAMPLE 7

Preparation of 2(p-toluenesulfonamido)-5-bromo-4-styrylpyrimidine

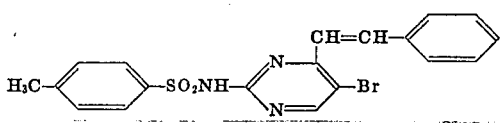

0.5 g. of 2-amino-5-bromo-4-styrylpyrimidine, 2 ml. of pyridine and 0.31 g. of p-toluenesulfonyl chloride were mixed and reacted at 90° – 100° C. for 6 hours. Crystals precipitated in the reaction mixture were separated by filtration and washed with water and methanol to give crude yellow crystals, melting at 258°–261° C. yield 0.49 g. (49.1 percent). Recrystallization from dimethylformamide to produced pale yellow crystals in the form of prisms, melting at 265° – 265.5° C.

Elemental analysis: $C_{19}H_{16}O_2N_3SBr$
Calcd.: C, 53.03 (%); H, 3.75 (%)
Found: C, 52.97 (%); H, 3.86 (%)

EXAMPLE 8

Preparation of 2-(benzenesulfonamido)-4-(4-phenyl-1,3-butadienyl)-pyrimidine.

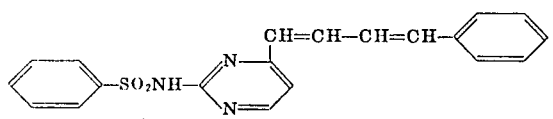

0.7 g. of 2-amino-4-(4-phenyl-1,3-butadienyl)-pyrimidine, 2ml. of pyridine and 0.61 g. of benzene-sulfonylchloride were mixed and reacted at 90° – 100° C. for 4 hours. Crystals precipitated in the reaction mixture were isolated by filtration and washed with water and methanol to give crude yellow crystals, melting at 276° – 277° C. Yield: 0.87 g. (76.5 %). Recrystallization from ethylene glycol monomethylether produced yellow crystals in the form of prisms, melting at 285°–286° C.

Elemental analysis: $C_{18}H_{15}O_2N_2S$
Calcd.: C, 64.08 (%); H, 4.48 (%)
Found: C, 64.24 (%); H, 4.65 (%)

EXAMPLE 9

Preparation of 2-(p-toluenesulfonamido)-5-methyl-4-(4-phenyl-1,3-butadienyl)-pyrimidine

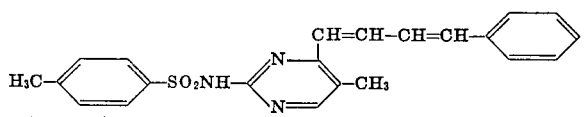

0.35 g. of 2-amino-5-methyl-4-(4-phenyl-1,3-butadienyl)-pyrimidine, 0.8 ml. of pyridine and 0.31 g. of p-toluenesulfonylchloride were mixed and reacted at 90° – 100° C. for 6 hours. After cooling the reaction mixture, crystals precipitated in the mixture were isolated by filtration and washed with water and acetone to give crude yellow crystals, melting at 274° – 275° C. Yield: 0.38 g. (65.6 percent). Recrystallization from dimethylformamide produced yellow crystals in the form of prisms, melting at 278°–279° C.

Elemental analysis: $C_{22}H_{21}O_2N_3S$
Calcd.: C, 67.49 (%); H, 5.41 (%)
Found: C, 67.40 (%); H, 5.56 (%)

EXAMPLE 10

Preparation of 2-(benzenesulfonamido)-5-methyl-4-[4-(4-methylphenyl)-1,3-butadienyl]-pyrimidine.

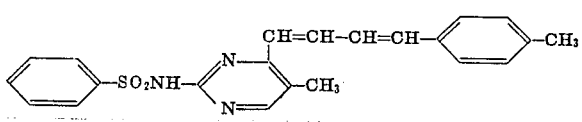

0.7 g. of 2-amino-5-methyl-4-[4-(4-methylphenyl)-1,3-butadienyl]-pyrimidine, 2 ml. of pyridine and 0.54 g. of benzenesulfonyl chloride were mixed and reacted at 90° – 100° C. for 6.5 hours. After cooling the reaction mixture, crystals precipitated in the mixture were isolated by filtration and washed with methanol to give crude yellow crystals. Yield: 0.65 g. (58.5 percent). Recrystallization from ethylene glycol monomethylether produced yellow crystals in the form of needles, melting at 271° – 273° C.

Elemental analysis: $C_{22}H_{21}O_2N_3S$
Calcd.: C, 67.49 (%); H, 5.41 (%)
Found: C, 67.37 (%); H, 5.47 (%)

EXAMPLE 11

Preparation of 2-(benzenesulfonamide)-4-[3-methyl-4-(4-chlorophenyl)-1,3-butadienyl]-pyrimidine.

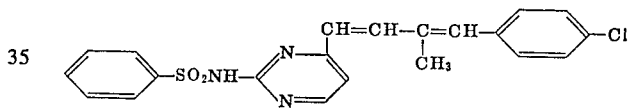

0.4 g. of 2-amino-4-[3-methyl-4-(4-chlorophenyl)-1,3-butadienyl]-pyrimidine, 0.5 ml. of dimethylaniline and 0.25 g. of benzenesulfonyl chloride were mixed and reacted at 90°–100° C. for 5.5 hours. After cooling the reaction mixture, crystals precipitated in the mixture were isolated by filtration and washed with water and methanol to give crude yellow crystals melting at 257°–260° C. Yield: 0.47 g. (70%). Recrystallization from ethylene glycol monomethylether produced yellow crystals in the form of prisms, melting at 274°–275° C.

Elemental analysis: $C_{21}H_{18}O_2N_3ClS$
Calcd.: C, 61.23 %; H, 4.40 %
Found: C, 61.53 %; H, 4,60 %

Similar to the method as described in Example 6,2-sulfonamido-4-substituted-pyrimidine derivatives were obtained as shown in Table 3.

Table 3

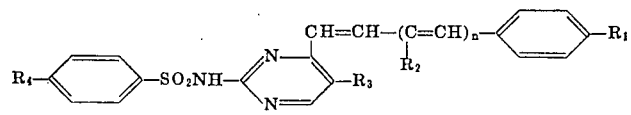

| $R_1$ | n | $R_2$ | $R_3$ | $R_4$ | Melting point (°C.) | Color | Form | Yield (%) |
|---|---|---|---|---|---|---|---|---|
| H | 0 | — | H | H | 252–253 | pale yellow | plate | 60.5 |
| H | 0 | — | H | Cl | 273–274.5 | pale yellow | prism | 71.5 |
| $CH_3$ | 0 | — | H | H | 273–274 | yellow | prism | 86.4 |

| R4 | n | R2 | R3 | R1 | mp | color | form | yield |
|---|---|---|---|---|---|---|---|---|
| CH₃ | 0 | — | H | CH₃ | 279–280 | yellow | prism | 63.5 |
| CH₃ | 0 | — | H | Cl | 292–294 | pale yellow | prism | 76.2 |
| Cl | 0 | — | H | H | 283–285 | yellow | needle | 85.5 |
| Br | 0 | — | H | H | 288–289 | yellow | needle | 69.3 |
| Br | 0 | — | H | CH₃ | 284–285 | yellow | needle | 74.3 |
| Br | 0 | — | H | Cl | 301–302 | yellow | needle | 91.5 |
| H | 1 | H | H | CH₃ | 264–265 | yellow | prism | 69.3 |
| H | 1 | H | H | Cl | 285–286 | yellow | prism | 67.3 |
| H | 1 | CH₃ | H | Cl | 254–255 | yellow | prism | 32.5 |
| Cl | 1 | CH₃ | H | CH₃ | 253–254.5 | yellow | needle | 64.0 |
| Cl | 1 | CH₃ | H | Cl | 245–246 | yellow | needle | 58.0 |
| Br | 1 | CH₃ | H | H | 265–266 | yellow | granular | 64.5 |
| Br | 1 | CH₃ | H | CH₃ | 252–253 | yellow | needle | 67.0 |
| CH₃ | 1 | CH₃ | H | CH₃ | 239–240 | yellow | needle | 43.1 |
| Br | 1 | C₂H₅ | H | CH₃ | 259–260 | yellow | plate | 36.4 |
| H | 0 | — | CH₃ | H | 289–290 | pale yellow | prism | 66.2 |
| H | 0 | — | CH₃ | CH₃ | 276–277 | pale yellow | plate | 57.8 |
| H | 0 | — | CH₃ | Cl | 280–282 | yellow | needle | 80.0 |
| CH₃ | 0 | — | CH₃ | H | 302–305 | pale yellow | prism | 51.8 |
| CH₃ | 0 | — | CH₃ | CH₃ | 298–300 | pale yellow | prism | 59.5 |
| H | 1 | H | CH₃ | H | 293–294 | yellow | prism | 49.0 |
| H | 1 | H | CH₃ | CH₃ | 278–279 | yellow | prism | 65.6 |
| CH₃ | 1 | H | CH₃ | H | 277–279 | yellow | needle | 58.5 |
| CH₃ | 1 | H | CH₃ | CH₃ | 272–274 | yellow | prism | 59.2 |
| H | 1 | CH₃ | CH₃ | CH₃ | 243–245 | pale yellow | needle | 69.6 |
| CH₃ | 1 | CH₃ | CH₃ | H | 237–239 | pale yellow | fiberous | 18.7 |
| CH₃ | 1 | CH₃ | CH₃ | CH₃ | 220–223 | yellowish brown | powder | 53.4 |
| H | 0 | — | Br | CH₃ | 265–266 | yellowish white | prism | 49.1 |
| Br | 0 | — | Br | CH₃ | over 315 | pale yellow | prism | 85.5 |
| Br | 0 | — | CH₃ | CH₃ | 311–312 | yellow | prism | 65.2 |

What is claimed is:

1. A novel sulfonamide pyrimidine derivative of the formula (I),

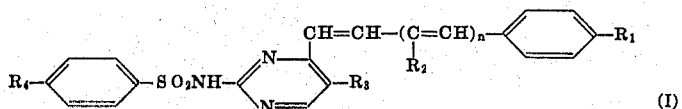

(I)

wherein $R_1$, $R_3$, $R_4$ are a hydrogen atom, a straight- or branched-chain lower alkyl group having one to five carbon atoms such as methyl, ethyl, propyl, isopropyl, n-butyl, isobutyl, n-amyl or isoamyl groups, or a halogen atom such as fluorine, chlorine, bromine or iodine atom; $R_2$ is a hydrogen atom straight- or branched-chain lower alkyl group having one to five carbon atoms $n$ is an integer of 0 or 1.

2. 2-(p-Toluenesulfonamide)-4-styryl-pyrimidine.

3. 2-(p-Toluenesulfonamide)-5-bromo-4-styryl-pyrimidine.

4. 2-Benzenesulfonamido-4-(4-phenyl-1,3-butadienyl)-pyrimidine.

5. 2-(p-Toluenesulfonamido)-5-methyl-4-(phenyl-1,3-butadienyl)-pyrimidine.

6. 2-Benzenesulfonamido-5-methyl-4-[4-(4-methylphenyl)-1,3-butadienyl]-pyrimidine.

7. 2-Benzenesulfonamido-4-[3-methyl-4-(4-chlorophenyl)-1,3-butadienyl]-pyrimidine.

* * * * *